United States Patent
Kimura et al.

[11] Patent Number: 6,127,293
[45] Date of Patent: *Oct. 3, 2000

[54] LAMINATED BODIES AND WOVEN AND NONWOVEN FABRICS COMPRISING α-OLEFIN POLYMERIC ADHESION MATERIALS CATALYZED WITH CYCLOPENTADIENYL CATALYST

[75] Inventors: Masato Kimura, Fujisawa; Katsumi Yano, Yokohama, both of Japan

[73] Assignee: Nippon Petrochemicals Co., Ltd., Tokyo, Japan

[*] Notice: This patent is subject to a terminal disclaimer.

[21] Appl. No.: 09/229,899

[22] Filed: Jan. 14, 1999

Related U.S. Application Data

[63] Continuation of application No. 08/572,163, Dec. 13, 1995, Pat. No. 5,861,202.

[30] Foreign Application Priority Data

Dec. 16, 1994 [JP] Japan ..................... 6-334228

[51] Int. Cl.[7] ..................................... B32B 5/12
[52] U.S. Cl. .................. 442/199; 442/334; 442/378; 156/177; 156/257; 156/334; 264/173.15; 264/173.19; 264/288.4; 428/105; 428/110; 428/139; 428/213; 428/346; 428/354; 428/344; 428/910; 428/515; 428/516
[58] Field of Search ...................... 442/334, 378, 442/199; 156/177, 257, 334; 428/105, 110, 131, 139, 213, 346, 354, 515, 516, 344, 910; 264/173.19, 288.4, 173.15

[56] References Cited

U.S. PATENT DOCUMENTS

| | | | |
|---|---|---|---|
| 3,639,573 | 2/1972 | Port ........................................... 264/75 |
| 3,853,662 | 12/1974 | Yazawa et al. ......................... 156/265 |
| 3,859,156 | 1/1975 | Yazawa et al. ......................... 156/265 |
| 3,904,334 | 9/1975 | Yazawa et al. ......................... 425/71 |
| 4,052,242 | 10/1977 | Yazawa et al. ......................... 156/265 |
| 4,349,500 | 9/1982 | Yazawa et al. ......................... 264/259 |
| 4,525,317 | 6/1985 | Okada et al. ......................... 264/235.8 |
| 4,929,303 | 5/1990 | Sheth ..................................... 156/209 |

(List continued on next page.)

FOREIGN PATENT DOCUMENTS

| | | |
|---|---|---|
| 0113117 | 7/1984 | European Pat. Off. . |
| 0213807 | 3/1987 | European Pat. Off. . |
| 0301599 | 2/1989 | European Pat. Off. . |
| 0 368 516 | 5/1990 | European Pat. Off. . |
| 0374785 | 6/1990 | European Pat. Off. . |
| 0402484 | 12/1990 | European Pat. Off. . |
| 0379763 | 5/1992 | European Pat. Off. . |

(List continued on next page.)

OTHER PUBLICATIONS

Van der Sanden et al., "A New Family of Linear Ethylene Polymers Provides Enhanced Sealing Performance," Tappi Journal, pp. 99–103, 1992.

*Primary Examiner*—Paul Thibodeau
*Assistant Examiner*—D. Lawrence Tarazano
*Attorney, Agent, or Firm*—Hollander Law Firm, P.L.C.

[57] ABSTRACT

The present invention provides a laminated body comprising a uniaxially stretched laminate composed of (I) a first thermoplastic resin layer and (II) an adhesion layer which has a lower melting point than said first thermoplastic resin layer (I) and is provided on at least one surface of said thermoplastic resin layer (I), said adhesion layer (II) being composed of a composition containing (A) 100 to 30% by weight of an α-olefin (co)polymer having a melt flow rate of 0.01 g to 100 g/10 minutes obtained by (co)polymerizing an α-olefin in the presence of a catalyst which includes at least one compound of a transition metal of Group IV in the Periodic Table containing a ligand having a cyclopentadienyl skeleton, and (B) up to 70% by weight of an olefin-based polymer; in one embodiment, the present invention relates to a nonwoven or woven fabric and a reinforced laminated body, each derived from the laminated body.

55 Claims, 3 Drawing Sheets

U.S. PATENT DOCUMENTS

| | | | |
|---|---|---|---|
| 4,992,124 | 2/1991 | Okada et al. | 264/235.8 |
| 5,032,442 | 7/1991 | Yamazaki et al. | 428/105 |
| 5,055,438 | 10/1991 | Canich | 502/117 |
| 5,234,652 | 8/1993 | Woodhams et al. | 264/210.2 |
| 5,358,792 | 10/1994 | Mehta et al. | 428/516 |
| 5,380,810 | 1/1995 | Lai et al. | 526/352 |
| 5,861,202 | 1/1999 | Kimura et al. | 428/105 |

FOREIGN PATENT DOCUMENTS

| | | |
|---|---|---|
| 0483780 | 5/1992 | European Pat. Off. . |
| 2633215 | 12/1989 | France . |
| 1807954 | 6/1969 | Germany . |
| 2042746 | 3/1972 | Germany . |
| 2721320 | 11/1978 | Germany . |
| 37-9765 | 7/1937 | Japan . |
| 44-22231 | 9/1969 | Japan . |
| 46-43275 | 12/1971 | Japan . |
| 47-47084 | 11/1972 | Japan . |
| 48-22966 | 7/1973 | Japan . |
| 49-48580 | 12/1974 | Japan . |
| 50-40185 | 12/1975 | Japan . |
| 50-40186 | 12/1975 | Japan . |
| 51-30182 | 8/1976 | Japan . |
| 53-38783 | 10/1978 | Japan . |
| 55-51058 | 12/1980 | Japan . |
| 57-30368 | 6/1982 | Japan . |
| 57-54581 | 11/1982 | Japan . |
| 59-32307 | 8/1984 | Japan . |
| 59-169858A | 9/1984 | Japan . |
| 60-37786 | 8/1985 | Japan . |
| 61-11757 | 4/1986 | Japan . |
| 61-23104 | 6/1986 | Japan . |
| 61-154833 | 7/1986 | Japan . |
| 62-104911 | 5/1987 | Japan . |
| 62-122736 | 6/1987 | Japan . |
| 62-28226 | 6/1987 | Japan . |
| 62-182349 | 8/1987 | Japan . |
| 63-203816 | 8/1988 | Japan . |
| 1-60408 | 12/1989 | Japan . |
| 2-258237 | 10/1990 | Japan . |
| 3-36948 | 6/1991 | Japan . |
| 4-49015 | 2/1992 | Japan . |
| 4-370234 | 12/1992 | Japan . |
| 5-228669 | 9/1993 | Japan . |
| 6-010233 | 1/1994 | Japan . |
| 1115915A | 9/1984 | U.S.S.R. . |
| 1181249 | 8/1967 | United Kingdom . |
| WO 91/18735 | 12/1991 | WIPO . |
| WO 94/06857 | 3/1994 | WIPO . |
| WO 96/16119 | 5/1996 | WIPO . |

LAMINATED BODIES AND WOVEN AND NONWOVEN FABRICS COMPRISING α-OLEFIN POLYMERIC ADHESION MATERIALS CATALYZED WITH CYCLOPENTADIENYL CATALYST

This application is a continuation of application Ser. No. 08/572,163, filed Dec. 13, 1995, now U.S. Pat. No. 5,861,202.

BACKGROUND OF THE INVENTION

1. Field of the Invention

The present invention relates to a laminated body, a nonwoven fabric or woven fabric and a reinforced laminated body using at least one of such fabrics therein, each of the bodies and fabrics having high adhesion strength, excellent low-temperature heat sealability and high mechanical strength such as tearing strength. It also relates to a reinforced laminated body comprising a base material such as paper, plastics or a foil, as well as a laminated body, nonwoven fabric or woven fabric which is excellent in bond strength of longitudinal and lateral ribbons which compose a nonwoven or woven fabric and is also excellent in low-temperature heat sealability, hot tack, moldability and the like.

2. Prior Art

Conventionally, a reinforced sheet obtained by extrusion laminating low-density polyethylene on a uniaxially stretched thermoplastic resin film or on a reinforced film made by the lamination of said resin films in such a manner that the stretch (or orientation) axes of said resin films cross each other, or a laminated body obtained by laminating the reinforced film on a base material such as paper, a foamed sheet, an aluminum foil or another metal foil, has been used as a spread sheet for a picnic spread, a protection sheet or cover for vehicles or the like, a cover material for agricultural use, a bag for synthetic resin pellets, a bag for cement, or the like. As to nonwoven fabrics formed by fibrillating (splitting) longitudinally and/or laterally uniaxially stretched films or nonwoven fabric or woven fabrics obtained by longitudinally and laterally laminating or weaving longitudinally uniaxially stretched tapes together, a film obtained by laminating low-density polyethylene produced by a high-pressure radical polymerization method on both the surfaces of high-density polyethylene is stretched and split, and the thus split portions of the meshy films are longitudinally and laterally laminated to each other in such a manner that the orientation axes of said meshy film portions cross each other and then fusion bond under heat whereby a polyethylene-made nonwoven or woven fabric is developed. The fabrics so developed have been used as a covering material for agriculture, a cover for putting greens on golf courses, a filter, a drain bag, a flower wrap, a house wrap and other materials for horticulture and architecture.

It has recently been eagerly demanded, however, to improve the adhesion strength of a composite product obtained by adhering a stretched film to a base material. It has also been demanded to further improve bags to be made from such a composite product or a single product (such as a stretched film alone) in the areas of low-temperature heat sealability, adhesion strength of sealed portions, and like areas in order to cope with high-speed bag-making procedures. It has also been eagerly demanded, in addition to the above improvements in various properties, to increase the adhesion strength of crossings where the longitudinal fibers and lateral fibers of nonwoven fabrics or woven fabrics cross each other.

SUMMARY OF THE INVENTION

The present invention was made to solve the problems described above. As a result of devoted studies to solve the problems, it has been found that the use of a selected adhesion layer in the preparation of a multilayered film made of a first thermoplastic resin base layer having a comparatively high melting point enables the production of the resulting multilayered film which is excellent in adhesion strength between the longitudinal and lateral tapes made by fibrillating the multilayered film as well as in low-temperature heat sealability, hot tack and the like. These desired properties are achieved without causing any troubles in the steps of lamination of the films (already stretched) to be used in the preparation of the multilayered film and in the steps of film fabrication, stretching, splitting, lamination (under heat and pressure) and the like at the time of preparing nonwoven fabrics from the multilayered film. Thus, the present invention has been accomplished, based on the above findings.

It is an object of the present invention to provide a laminated body and nonwoven or woven fabric which are capable of enhancing the adhesion strength between the longitudinally and laterally split tapes of said body and fabric and are excellent in low-temperature heat sealability, hot tack and the like without causing any troubles in the steps of film fabrication, stretching, fibrillating and lamination (under heat and pressure) and the like at the time of lamination of stretched films or at the time of manufacture of nonwoven fabrics.

It is another object of the present invention to achieve high-speed manufacture of bags and the like from laminated bodies, nonwoven or woven fabrics, or composites thereof with base materials.

The present invention provides a laminated body comprising a uniaxially stretched laminate composed of a first thermoplastic resin layer (I) and an adhesion layer (II) having a lower melting point than the first thermoplastic resin layer (I) and provided on at least one surface of the thermoplastic resin layer (I). The present invention also provides a laminated body comprising a plurality of uniaxially stretched laminates, in which body the uniaxially stretched laminates are further laminated to each other with the resin layer (I) of one of said stretched laminates being faced to the adhesion layer (II) of its adjacent laminate, wherein:

the adhesion layer (II) comprises a composition containing (A) 100 to 30% by weight of an α-olefin (co)polymer having a melt flow rate of 0.01 g to 100 g/10 minutes and obtained by (co)polymerizing an α-olefin in the presence of a catalyst containing at least one compound of a transition metal of Group IV in the Periodic Table (titanium zirconium, and hafnium) which contains a ligand having a cyclopentadienyl skeleton, and (B) up to 70% by weight of an olefin-based polymer.

The present invention further provides a laminated body comprising uniaxially stretched laminates each composed of a first thermoplastic resin layer (I) and adhesion layers (II) having a lower melting point than the first thermoplastic resin layer (I) and provided respectively on both the surfaces of the resin layer (I),
  wherein the uniaxially stretched laminates are further laminated with each other in such a manner that the stretch (orientation) axes of any two adjacent laminates are in parallel with each other or cross each other, or are non-parallel with respect to each other.

The present invention may provide said laminated body in which the α-olefin (co)polymer is an ethylene-α-olefin copolymer having a density of 0.86 to 0.94 g/cm$^3$.

The present invention may provide said laminated body in which said olefin-based polymer (B) is at least one member selected from the following ethylene-based polymers ($B_1$) and ($B_2$):

($B_1$) ethylene-α-olefin copolymer having a density of 0.86 to 0.95 g/cm$^3$, and ($B_2$) low-density polyethylene obtained by means of radical polymerization under high pressure, an ethylene/vinyl ester copolymer, a copolymer of ethylene-α,β-unsaturated carboxylic acid or its derivative.

The present invention may provide the laminated body in which a stretching rate of said uniaxially stretched laminate is in a range of from 1.1 to 15 times.

The present invention may provide the laminated body in which the thickness of the first thermoplastic resin layer (I) in said uniaxially stretched laminate is in a range of from 20 to 100 μm and the thickness of the adhesion layer (II) is in a range of from 3 to 60μm.

The present invention may provide the laminated body wherein said uniaxially stretched laminate is at least one member selected from the group consisting of (a) a longitudinally uniaxially stretched film, (b) a laterally uniaxially stretched film, and (c) a uniaxially stretched tape.

The present invention may provide a nonwoven fabric or woven fabric in which at least two laminates selected from (a) longitudinally uniaxially stretched meshy films and (b) laterally uniaxially stretched meshy films, or selected from (c) uniaxially stretched tapes, are further laminated or woven together with the aid of the adhesion layer (II) in such a manner that the stretch (orientation) axes of any two adjacent ones of said laminates are in parallel with each other or cross each other.

The present invention may provide a reinforced laminated body including the laminated body, nonwoven fabric or woven fabric, and a base material therefor.

A detailed description of the present invention will further be made below.

The resins usable as the first thermoplastic resin layer (I) in the present invention are crystalline thermoplastic resins having stretchability and include crystalline and stretchable resins. These resins include a homopolymer of an α-olefin such as a high/intermediate/low-density polyethylene, polypropylene, polybutene-1, poly4-methylpentene-1, and polyhexene-1, and a copolymer of different α-olefins such as a copolymer of ethylene with other α-olefins and a copolymer of propylene with other α-olefin, and also include polyamide, polyester and polyvinyl alcohol.

Among these resins described above, the especially preferable ones are a propylene homopolymer, a propylene-based polymer such as a copolymer of mainly propylene with other α-olefins, an ethylene homopolymer having a density of 0.94 to 0.98 g/cm$^3$, and an ethylene-based polymer such as a copolymer of mainly ethylene with other α-olefins. The α-olefins described above are preferably ones having 2 to 10 carbon atoms such as ethylene, propylene, butene-1, poly-4-methylpentene-1, and hexene-1. The contents of these comonomers are selected in a range of from 3 to 15 mol%. The melt flow rate (MFR) of the propylene-based polymer and/or the ethylene-based polymer having a density of from 0.94 to 0.98 g/cm$^3$ is selected in a range of from 0.01 to 30 g/10 minutes, preferably in a range of from 0.1 to 20 g/10 minutes, and more preferably in a range of from 0.2 to 10 g/10 minutes.

The α-olefin polymer (or copolymer) or the composition thereof used for the adhesion layer (II) according to the present invention comprises (A) a composition containing (a) 100 to 30% by weight of an α-olefin (co)polymer having a melt flow rate of from 0.01 g to 100 g/10 minutes obtained by (co)polymerizing an α-olefin in the presence of a catalyst which includes at least one compound of a transition metal of Group IV in the Periodic Table containing a ligand having a cyclopentadienyl skeleton, and (B) up to 70% by weight of an olefin-based polymer. In addition, these (co)polymers or compositions may be modified for their use.

The α-olefin (co)polymer (A) described above can be obtained by (co)polymerizing ethylene alone or propylene alone, or ethylene or propylene and one or more of other α-olefins in the presence of a catalyst which includes a compound of transition metal of Group IV in the Periodic Table containing a ligand having the cyclopentadienyl skeleton described above, a promoter, an organic aluminum compound and/or a catalyst support as required. Further, a composition obtained by preliminarily polymerizing the above catalyst with ethylene and/or the α-olefin may be used as a catalyst.

The above α-olefin is one having from 2 to 20 carbon atoms, preferably from 2 to 12 carbon atoms, and it includes ethylene, propylene, butene-1, 4- methylpentene-1, hexene-1, octene-1, decene-1 and dodecene-1.

The content of these α-olefins used as a comonomer of a copolymer is generally selected in a range of not more than 30 mol %, and preferably from 3 to 20 mol %.

The cyclopentadienyl skeleton of a compound of a transition metal of Group IV in the Periodic Table containing a ligand having a cyclopentadienyl skeleton, which compound is included in a catalyst used for manufacturing the α-olefins (co)polymer used in the present invention, includes a cyclopentadienyl group and a substituted cyclopentadienyl group. The substituted cyclopentadienyl group is one having at least one substituent selected from the group consisting of a hydrocarbon group having from 1 to 10 carbon atoms, a silyl group, a silyl-substituted alkyl group, a silyl-substituted aryl group, a cyano group, a cyanoalkyl group, a cyanoaryl group, a halogen group, a haloalkyl group and a halosilyl group. The substituted cyclopentadienyl group may have two or more substituents, and the substituents described above may be coupled to each other to form a ring thereof.

The hydrocarbon group having 1 to 10 carbon atoms includes an alkyl group, a cycloalkyl group, an aryl group or an aralkyl group, and more specifically, it includes an alkyl group such as methyl, ethyl, n-propyl, isopropyl, n-butyl, isobutyl, sec-butyl, t-butyl, pentyl, hexyl, octyl, 2-ethylhexyl or decyl group; a cycloalkyl group such as cyclopentyl or cyclohexyl group; an aryl group such as phenyl or tolyl group; or an aralkyl group such as benzyl or neophyl group. Among them, an alkyl group is preferable.

Preferable substituted cyclopentadienyl groups include methylcyclopentadienyl, ethyl-cyclopentadienyl, n-hexylcyclopentadienyl, 1,3-dimethylcyclopentadienyl group, 1,3-butylmethyl-cyclopentadienyl, and 1,3-propylmethyl-cyclopentadienyl. Among the substituted cyclopentadienyl groups used in the present invention, a cyclopentadienyl group which has been substituted by an alkyl group having 3 carbon atoms is preferable with a 1,3-substituted cyclopentadienyl group being more preferable.

A substituted cyclopentadienyl group in which substituents, namely hydrocarbons, will link to each other to form 1 or 2 or more rings, preferably includes an indenyl group, a substituted indenyl group substituted by a substituent such as a hydrocarbon group (an alkyl group) having from 1 to 8 carbon atoms, a naphthyl group, a substituted naphthyl group substituted by a substituent such as a hydrocarbon group (an alkyl group) having from 1 to 8 carbon atoms, or a substituted fluorenyl group substituted by a substituent such as a hydrocarbon group (an alkyl group) having from 1 to 8 carbon atoms.

Transition metals contained in the complex of transition metal of Group IV in the Periodic Table and containing a ligand having a cyclopentadienyl skeleton include zirconium, titanium and hafnium, with zirconium being especially preferable.

The transition metal complex normally contains 1 to 3 ligands each having a cyclopentadienyl skeleton, and in a case where the compound contains 2 or more ligands, the ligands may be linked to each other with a bridging group. It should be noted that the bridging group includes an alkylene group having from 1 to 4 carbon atoms, an alkylsilanezyl group or a silanezyl group.

Ligands other than the ligand having a cyclopentadienyl skeleton in the Group IV transition metal complex, typically include hydrogen, a hydrocarbon group (such as an alkyl group, an aryl group, an alkylaryl group, an aralkyl group and a polyenyl group) having from 1 to 20 carbon atoms, a halogen, a metalkyl group and a metaryl group.

The compound of a transition metal belonging to Group IV in the Periodic Table and containing a ligand having a cyclopentadienyl skeleton may be a monoalkyl metallocene, a dialkyl metallocene, a trialkyl metallocene, a monocyclopentadienyl titanocene, a substituted cyclopentadienyl titanium compound, or a zirconocene compound. Monoalkyl metallocenes include bis(cyclopentadienyl) titanium methylchloride, bis(cyclopentadienyl) titanium phenylchloride, bis(cyclopentadienyl) zirconium methylchloride or bis(cyclopentadienyl) zirconium phenylchloride.

Dialkyl metallocenes include bis(cyclopentadienyl) titanium dimethyl, bis-(cyclopentadienyl) titanium diphenyl, bis(cyclopentadienyl) zirconium dimethyl, bis (cyclopentadienyl) zirconium diphenyl, bis (cyclopentadienyl) hafnium dimethyl or bis (cyclopentadienyl) hafnium diphenyl.

Trialkyl metallocenes include cyclopentadienyl titanium trimethyl, cyclopentadienyl zirconium trimethyl, cyclopentadienyl zirconium triphenyl, cyclopentadienyl zirconium trineopentyl, cyclopentadienyl hafnium trimethyl or cyclopentadienyl hafnium triphenyl.

Monocyclopentadienyl titanocenes include pentamethyl cyclopentadienyl titanium trichloride, pentaethyl cyclopentadienyl titanium trichloride or bis(pentamethyl cyclopentadienyl) titanium diphenyl.

Substituted cyclopentadienyl titanium compounds include substituted bis(cyclopentadienyl) titanium compounds including bis(indenyl) titanium diphenyl or dichloride or bis(methylcyclopentadienyl) titanium diphenyl or dihaloride; a dialkyl, trialkyl, tetraalkyl or pentaalkyl cyclopentadienyl titanium compound including bis(1,2-dimethyl cyclopentadienyl) titanium diphenyl or dichloride, bis(1,2-diethyl cyclopentadienyl) titanium diphenyl or dichloride or other dihalide complex; and a complex of silicon and amine or carbon linkage cyclopentadiene including dimethyl silyl dicyclopentadienyl titanium diphenyl or dichloride, methylene dicyclopentadienyl titanium diphenyl or dichloride or other dihalide complex.

Zirconocene compounds include pentamethyl cyclopentadienyl zirconium trichloride, pentaethyl cyclopentadienyl zirconium trichloride or bis-(pentamethyl cyclopentadienyl) zirconium diphenyl; an alkyl substituted cyclopentadiene such as bis-(ethyl cyclopentadienyl) zirconium dimethyl, bis(methyl cyclopentadienyl) zirconium dimethyl, bis(n-butyl cyclopentadienyl) zirconium dimethyl or a complex of haloalkyl or dihalide thereof; a dialkyl, trialkyl, tetraalkyl, or pentaalkyl cyclopentadiene such as bis(pentamethyl cyclopentadienyl) zirconium methyl bis(1,2dimethyl cyclopentadienyl) zirconium dimethyl or a complex of dihalide thereof; and a complex of silicon and carbon linkage cyclopentadiene such as dimethylsilyl dicyclopentadienyl zirconium dimethyl or dihalide, or methylene dicyclopentadienyl zirconium dimethyl or dihalide.

Examples of compounds of other transition metals of Group IV in the Periodic Table are those containing a ligand having a cyclopentadienyl skeleton or containing another ligand such as hydrogen, halogen or a $C_{1-20}$ alkyl group, and those in which the transition metals together form a ring, as represented by the following general formula (I):

In the formula (I), Cp indicates a ligand having a cyclopentadienyl skeleton; X indicates hydrogen, halogen, an alkyl group having 1 to 20 carbon atoms, an arylsilyl group, an aryloxy group, an alkoxy group, an amide group or a silyloxy group; Y indicates a divalent group selected from the group consisting of $SiR_2$, $CR_2$, $SiR_2SiR_2$, $CR_2CR_2$, $CR=CR$, $SiR_2CR_2$, $BR_2$ and BR; Z indicates a divalent neutral ligand selected from the group consisting of —O—, —S—, —NR—, —PR—, OR, SR, $NR_2$ and $PR_2$. It should be noted that R indicates hydrogen or an alkyl group having 1 to 20 carbon atoms, an aryl group, a silyl group, a halogenated alkyl group and a halogenated aryl group; or an R group in Y and Z or 2 or more R groups from Y and Z form a condensed ring system; and M indicates a transition metal atom of Group IV in the Periodic Table.

The metal coordination compounds of the formula I include (t-butylamide)(tetramethyl $\eta^5$ cyclopentadienyl)-1, 2-ethane zirconium dichloride, (t-butylamide)(tetramethyl cyclopentadienyl)-1,2-ethanedyl titanium dichloride, (methylamide)-(tetramethyl cyclopentadienyl)-1,2-ethanedyl zirconium dichloride, (methylamide)(tetramethyl cyclopentadienyl)-1,2-ethanedyl titanium dichloride, (ethylamide)(tetramethyl cyclopentadienyl)-methylenethane dichloride, (t-butylamide) dimethyl (tetramethyl cyclopentadienyl) silane titanium dichloride, (t-butylamide)dimethyl(tetramethyl cyclopentadienyl) silane zirconium dichloride, (t-butylamide)dimethyl-(tetramethyl cyclopentadienyl) silane zirconium dibenzyl, (benzylamide)dimethyl (tetramethyl cyclopentadienyl) silane titanium dichloride and (phenylphosphide) dimethyl (tetramethyl cyclopentadienyl) silane titanium dichloride.

The promoter used in the present invention is such that it can make a compound (complex) of a transition metal of Group IV in the Periodic Table effective as a catalyst for polymerization or can make balanced ionic charge in a catalytically activated state. The actual promoters include aluminoxane which is an organic aluminoxy compound and is soluble in benzene, an aluminiumoxy compound which is not soluble in benzene, a boron compound, a lanthanoid salt such as lanthanum oxide and tin oxide. Among them, aluminoxane is the most preferable.

The catalysts described above may be carried on a carrier made of an inorganic compound or organic compound for use. As the carrier, a porous inorganic or organic oxide compound is preferable. The oxide compounds include $SiO_2$, $Al_2O_3$, MgO, $ZrO_2$, $TiO_2$, $B_2O_3$, CaO, ZnO, BaO, Tho and mixtures thereof, and also $SiO_2$—$Al_2O_3$, $SiO_2$—

$TiO_2$, $SiO_2$—$V_2O_5$, $SiO_2$—MgO and $SiO_2$—$Cr_2O_3$ are included. Among the compounds described above, those containing as the principal component at least one member selected from the group consisting of $SiO_2$ and $Al_2O_3$, are preferable.

The organic oxide compounds that can be used include both the thermoplastic and thermosetting resins and are exemplified by polyolefin, polyester, polyamide, polyvinyl chloride, poly(meta)methyl acrylate, polystyrene, polynorbornene, and various kinds of natural high molecule compounds and mixtures thereof.

The organic aluminium compounds used herein include trialkyl aluminium such as triethyl aluminium, triisopropyl aluminium; dialkyl aluminium halide; alkyl aluminium sesquihalide; alkyl aluminium dihalide; alkyl aluminium halide and organic aluminum alkoxide.

The methods of producing the α-olefin (co)polymer (A) used in the present invention include a gas phase polymerization method substantially not using any solvent therein, a slurry polymerization method, and a solution polymerization method, each of which is conducted in the presence of the catalyst described above. The said α-olefin (co)polymer is produced in the substantial absence of oxygen and water and in the presence of an inert hydrocarbon solvent illustrated by an aliphatic hydrocarbon such as butane, pentane, hexane or heptane; an aromatic hydrocarbon such as benzene, toluene or xylene; or an alicyclic hydrocarbon such as cyclohexane or methyl cyclohexane. There are not any specific restrictions on the polymerization, but generally the polymerization is conducted at a temperature of from 15 to 350° C., preferably 20 to 200° C., and more preferably 50 to 110° C., while a pressure for the polymerization is generally in a range of from the atmospheric pressure to 70 kg/cm²G and preferably from the atmospheric pressure to 20 kg/cm²G in a case of a low or medium pressure method, or 1500 kg/cm²G or below in a case of a high pressure method. Time for the polymerization is generally in a range of from 3 minutes to 10 hours and preferably 5 minutes to 5 hours in a case of a low or medium pressure method. In a case of a high pressure method, the time for polymerization is generally in a range of from 1 minute to 30 minutes and preferably 2 minutes to around 20 minutes. Further, the polymerization method is not limited to any specific method, and it may be a single-stage polymerization method or a multistage polymerization method in which the conditions for polymerization such as a hydrogen concentration, a monomer concentration, a pressure for polymerization, a temperature for polymerization, a catalyst and the like are different in each stage.

The particular α-olefin (co)polymer (A) used in the present invention and obtained with the catalyst mentioned above includes a homopolymer of ethylene, propylene or butene-1; a copolymer of ethylene with another α-olefin; or a copolymer of propylene with another α-olefin. Among them, there is preferred an ethylene-based polymer which is an ethylene-α-olefin copolymer and has a density of from 0.86 to 0.94 g/cm³ or preferably 0.89 to 0.93 g/cm³, a melt flow rate of from 0.01 to 100 g/minutes and preferably 0.1 to 50 g/minutes, and a molecular weight distribution (Mw/Mn) of from 1.5 to 5.0 and preferably 1.8 to 4.5. Further, the preferable propylene-based polymer is isotactic polypropylene or syndiotactic polypropylene. The characteristics or properties of these polymers are different from those of the α-olefin (co)polymers obtained with a conventional Ziegler-type catalyst or Philips-type catalyst.

Namely, since the active sites of the catalyst are uniform, the polymer according to the present invention obtained with the catalyst described above has a relatively narrow molecular-weight distribution and a substantially identical branch density of each molecular chain. Because of the characteristics of this molecular structure, as the number of branches increases, a crystal lamella thickness of the resin becomes thinner with the melting point thereof being lower. This is the reason why the resin is excellent in low-temperature sealability. In addition, because the crystal lamella thickness becomes thinner, a number of tie-molecules extending over the lamella increases, which can be considered as a cause for higher sealing strength.

Moreover, because the crystal size is made small and uniform, the solidification speed when cooled from the melted state becomes higher thereby to make it possible to improve the heat-seal speed.

In the present invention, there are not any specific restrictions on a difference between the melting point of the first thermoplastic resin layer (I) and that of the adhesion layer (II), and either the same or different kind of a polymer may be employed for this invention, provided that the difference is 5° C. or more. Generally it is desirable that a polymer having a density of from 0.86 to 0.94 g/cm³ be selected in a case where the adhesion layer (II) is an ethylene-α-olefin copolymer.

If the density of the ethylene-α-olefin is less than 0.86 g/cm³, then the laminated body, nonwoven fabric or woven fabric is likely to degrade in heat resistance and strength of adhesion to a base material. If the density of the ethylene-α-olefin copolymer is more than 0.94 g/cm³, then the copolymer will be deteriorated in low-temperature sealability and the difference of the copolymer in melting point from the first thermoplastic resin layer (I) will be lost. This may in turn result in loss of the strength of the stretched first thermoplastic resin layer at the time of manufacture of the body or fabrics or at the time of contact bonding them under heat to a base material.

The olefin-based resin (B) used in the present invention includes an ethylene-based polymer or a polypropylene-based polymer obtained with a Ziegler-type catalyst or a Philips-type catalyst in the conventional ion polymerization method, and is preferably ($B_1$) an ethylene-α-olefin copolymer having the density in a range of from 0.86 to 0.95 g/cm³. Examples of such materials are a linear medium density polyethylene (MDPE), a linear low-density polyethylene (LLDPE) and very low-density polyethylene (VLDPE).

The linear medium/low-density polyethylene (MDPE, LLDPE) has a density in a range of from 0.91 to 0.95 g/cm³ and preferably 0.91 to 0.94 g/cm³ (LLDPE), and the melt flow rate (MFR) in a range of from 1 to 20 g/10 minutes, preferably 0.5 to 15 g/10 minutes, and more preferably 0.7 to 10 g/10 minutes. The melt tension is in a range of from 0.3 to 5.0 g, preferably 0.4 to 4.0 g, and more preferably 0.5 to 3.5 g. The Mw/Mn ratio is in a range of from 2.5 to 5, and preferably 3 to 4.5. It should be noted that the molecular weight distribution (Mw/Mn) is a value obtained by dividing a weight average molecular weight by a number average molecular weight, each value obtained by means of Gas Permeation Chromatography (GPC) analysis.

The very low-density polyethylene (VLDPE) is polyethylene showing characteristics between those of straight chain low-density polyethylene (LLDPE) and those of ethylene-α-olefin copolymer rubber (EPR, EPRM). The VLDPE is preferably a particular ethylene-α-olefin copolymer having a density in a range of from 0.86 to 0.91 g/cm³, a maximum peak temperature (Tm) of 60° C. or more when measured according to the Differential Scanning Calorimetry method (DSC) which should preferably contain more than 10% by weight of an insoluble portion in boiled n-hexane. The very low-density polyethylene is a resin which is polymerized by using a catalyst comprising a solid catalyst ingredient containing at least titanium and/or vanadium and an organic aluminium compound and has both a highly crystalline portion as exhibited by the straight chain low-density polyethylene and a non-crystalline portion as exhibited by the ethylene-α-olefin copolymer rubber, and in which the mechanical strength, heat resistance and the like, which are features of the former, and the rubber-like elasticity, low-temperature shock resistance and the like, which are features of the latter, are well balanced.

The α-olefin of the ethylene-α-olefin copolymer described above is one having 3 to 12 carbon atoms, preferably in a range of from 3 to 10, and includes propylene, butene-1, 4-methylpentene, hexene-1, octene-1, decene-1 or dodecene-1.

The content of these α-olefins should preferably be in a range of from 3 to 40 mol %.

The other ethylene-based polymer ($B_2$) used in this invention may be a low-density polyethylene obtained through radical polymerization at a high pressure, an ethylene/vinyl ester copolymer, or a copolymer with an ethylene-α,β-unsaturated carboxylic acid or its derivative.

The low-density polyethylene (LDPE) described above has a MFR (melt flow rate) in a range of from 1 to 20 g/10 minutes, preferably 0.5 to 15 g/10 minutes, and more preferably 1.0 to 10 g/10 minutes. When the MFR is in the range described above, the melt tension of the resin is in an appropriate range, thus making it easy to mold the resin into a film. The density of said polyethylene is in a range of from 0.91 to 0.94 g/cm$^3$, preferably 0.912 to 0.935 g/cm$^3$, and more preferably 0.912 to 0.930 g/cm$^3$, while the melt tension is in a range of from 1.5 to 25 g, preferably 3 to 20 g, and more preferably 3 to 15 g.

Further, the Mw/Mn is in a range of from 3.0 to 10, and preferably 4.0 to 8.0. The melt tension is a factor indicating the elasticity of a resin, and if the melt tension is in the range described above, it is easy to mold the resin into a film.

The ethylene-vinyl ester copolymer described above is a copolymer with a vinyl ester monomer containing ethylene as the main component produced through a high-pressure radical polymerization method, the vinyl ester monomer being such as vinyl propionate, vinyl acetate, vinyl caprolate, vinyl caplirate, vinyl laurate, vinyl stearate or trifluoro-vinyl acetate. Among them, vinyl acetate is the most preferable. Namely, it is preferable to use herein a copolymer containing 50 to 99.5% by weight of ethylene, 0.5 to 50% by weight of vinyl ester and 0 to 49.5% by weight of other copolymerizable unsaturated monomer. Especially the content of vinyl ester is in a range of from 3 to 20 weight %, and preferably 5 to 15 weight %.

The MFR of these copolymers is in a range of from 0.1 to 20 g/10 minutes, and preferably 0.3 to 10 g/10 minutes, while the melt tension is in a range of from 2.0 to 25 g, and preferably 3 to 20 g.

The typical copolymer with an ethylene-α,β-unsaturated carboxylic acid or a derivative thereof includes a copolymer with ethylene-(meth)acrylic acid or its alkyl ester, and the comonomers used in these copolymers include acrylic acid, methacrylic acid, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, cyclohexyl acrylate, cyclohexyl methacrylate, lauryl acrylate, methacrylate, stearyl acrylate, stearyl methacrylate, glycidil acrylate and glycidil methacrylate. Among them, specially preferable comonomers include an ester of (meth)acrylic acid with an alkyl such as methyl or ethyl. It is especially preferred when the content of a (meth)acrylic acid ester is in a range of from 3 to 20% by weight, and preferably 5 to 15% by weight.

The MFR of these copolymers is in a range of from 0.1 to 20 g/10 minutes, and preferably 0.3 to 10 g/10 minutes, while the melt tension thereof is in a range of from 2.0 to 25 g, and preferably 3 to 20 g.

As for a mixing ratio of the components (A) and (B) used in the present invention, the content of the component (A) is in a range of from 100 to 30% by weight, and that of the component (B) is in a range of from 0 to 70% by weight. In a case where the adhesion strength of longitudinal and lateral tapes or the low-temperature heat sealability is to be emphasized, it is desirable to use the component (A) as the main component, but in a case where the processability and cost of the resulting product are to be emphasized while retaining the adhesion strength of longitudinal and lateral tapes or the low-temperature heat sealability to a certain degree, it is desirable to use moderately the component (B) as the main component. In a case where the content of the component (A) is less than 30% by weight and the content of the component (B) is more than 70% by weight, desired levels of adhesion strength of the longitudinal and lateral tapes and the low-temperature heat sealability thereof are sometimes unlikely to be achieved.

The uniaxially stretched laminate according to the present invention includes a uniaxially stretched film, a uniaxially stretched meshy film, a uniaxially stretched tape, flat yarn or the like, and is at least one kind of a uniaxially stretched laminate such as (a) a longitudinally uniaxially stretched film, (b) a laterally uniaxially stretched film, or (C) a uniaxially stretched tape.

These uniaxially stretched laminates may be used as a single sheet or as a laminated body composed of a plurality of the laminates adhered to each other, and also may be used so that the orientation axes of the laminates cross each other.

Especially nonwoven fabric or woven fabric is formed by laminating or weaving together at least two uniaxially stretched laminates selected from (a) longitudinally uniaxially stretched meshy films, (b) laterally uniaxially stretched meshy films, and (c) uniaxially stretched tapes, each forming a structure comprising (I) a first thermoplastic resin layer and (II) an adhesion layer. More particularly, the nonwoven or woven fabric is produced by laminating or weaving together at least two laminates in such a manner that the stretch (or orientation) axes of the laminates cross each other with the thermoplastic resin layer (I) side of one of the laminates being faced to the adhesion layer (II) side of another thereof.

A stretch ratio for the uniaxially stretched laminate is selected in a range of from 1.1 to 15 times, and preferably 3 to 10 times. If the stretch ratio is less than 1.1 times, it is difficult to obtain a laminate (defined as already stretched in uniaxial direction in this invention) having adequate mechanical strength. On the other hand, if the stretch ratio is more than 15 times, it is difficult to conduct stretch according to an ordinary method and, therefore, expensive equipment is disadvantageously required for the stretch.

The stretch as defined in the present invention includes one conducted by a rolling method or stretch method, and among the stretch methods, a free uniaxial stretch method is especially preferable.

The free uniaxial stretch method is such that a sufficient stretching range (a space between a low-speed roller and a high-speed roll) is set against the width of a thermoplastic resin film to be stretched, and the film is stretched so that the film can freely contract in the lateral direction. Assuming that the width of a film before stretched is W', the width of the resulting uniaxially stretched film is W, and a stretch ratio is V, then the following formula is provided:

$$X=1-(V^{-\frac{1}{2}}) \times (W'/W)$$

wherein X is an index indicating uniaxial stretchability of the film, and as the value of X (>=0) is closer to zero (0), it indicates that the original width and thickness of the film are decreased at the same rate when uniaxially stretched.

In the rolling method as defined in the present invention, a thermoplastic resin film is rolled at a temperature lower than the melting (softening) point of the film by passing the film between two heating rolls having therebetween a clearance smaller than the thickness of the film, thereby to lengthen the film in proportion to the reduction of its thickness.

There is no specific restriction on a ratio of the thickness of the first thermoplastic resin layer (I) verse that of the adhesion layer (II) in a laminate, but generally the thickness of the adhesion layer (II) should preferably be less than 50% of that of the uniaxially stretched laminate as a whole, and more preferably less than 40%, to maintain the mechanical strength and the like of the laminate.

In addition, the thickness of the first thermoplastic resin layer (I) of the film (which is the same as the uniaxially stretched laminate) or the tape (which is obtained by splitting the film) should preferably be in a range of from 20 to 100 μm. If the thickness of the adhesion layer (II) is 3 μm or more, then various physical properties such as adhesion strength at the time of contact bonding the films or tapes under heat are satisfied, but generally the thickness of the layer (II) is specified in a range of from 3 to 60 μm, and preferably 5 to 40 μm.

Further, it is desirable from the standpoint of manufacture and maintenance of mechanical strength of the final products, that the melting point of the adhesion layer (II) is lower than that of the first thermoplastic resin layer (I) by at least 5° C. or more, preferably 10 to 50° C. or more.

The nonwoven or woven fabric of the present invention is formed by laminating or weaving at least two laminates according to the present invention selected from the group consisting of (a) a longitudinally uniaxially stretched meshy film, (b) a laterally uniaxially stretched meshy film, and (c) uniaxially stretched tapes, each of the materials (a), (b) and (c) forming a multilayered structure comprising (I) a first thermoplastic resin layer and (II) an adhesion layer, in such a manner that the orientation axes of one of the uniaxially stretched laminates and another thereof cross each other with the resin (I) side of the former being faced to the adhesion layer (II) side of the adjacent laminate. An example of manufacture of these fabric products is described below.

Figure 1:
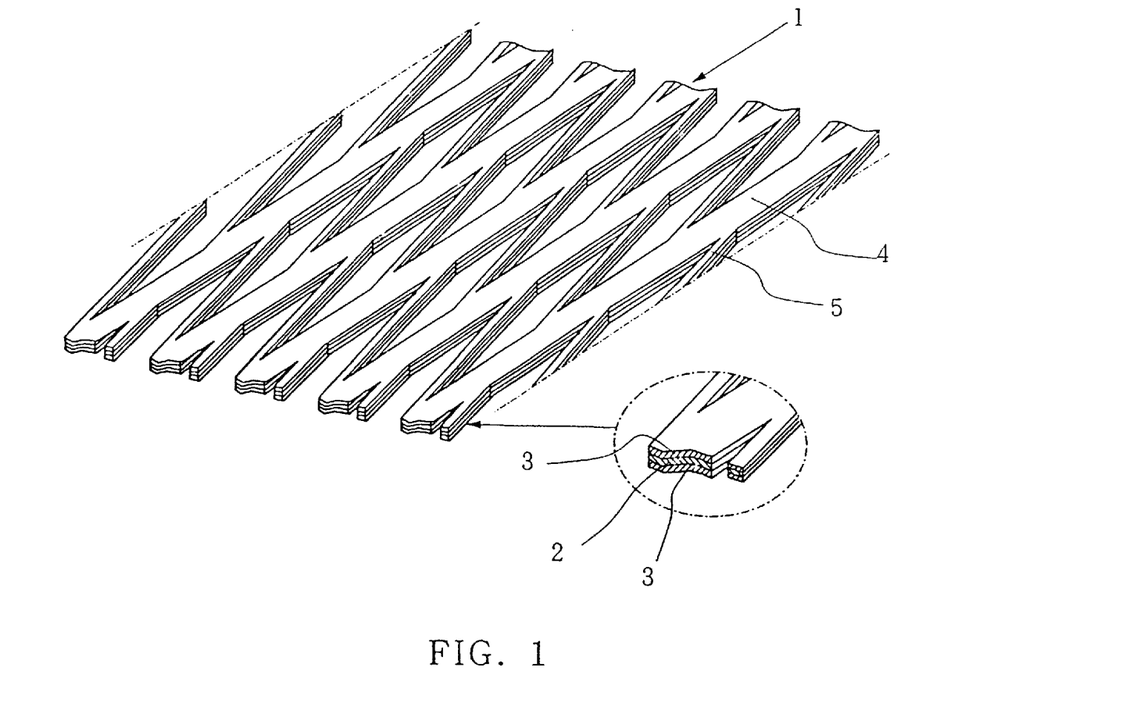
FIG. 1 is a perspective view showing a longitudinally uniaxially stretched meshy film (a) according to the present invention.

As shown in FIG. 1, the longitudinally uniaxially stretched meshy film (a) used in the present invention is illustratively prepared by firstly producing a multilayered film comprising at least two layers from a first thermoplastic resin layer (I) and an adhesion layer (II) having a lower melting point than the thermoplastic resin layer (I). The multilayered film is produced by using an extrusion molding method such as a multilayer inflation method or multilayer T-die method, longitudinally stretching the thus produced multilayered film at a stretch ratio of 1.1 to 15 times, preferably 8 to 10 times, thereafter fibrillating the stretched multilayered film longitudinally and staggeringly (in a cross-stitch form) with a fibrillator, enlarging the width of the fibrillated multilayered film, and then fixing the enlarged film in a desired fixed form if required, thereby to obtain the longitudinally uniaxially stretched meshy film.

Figure 2:
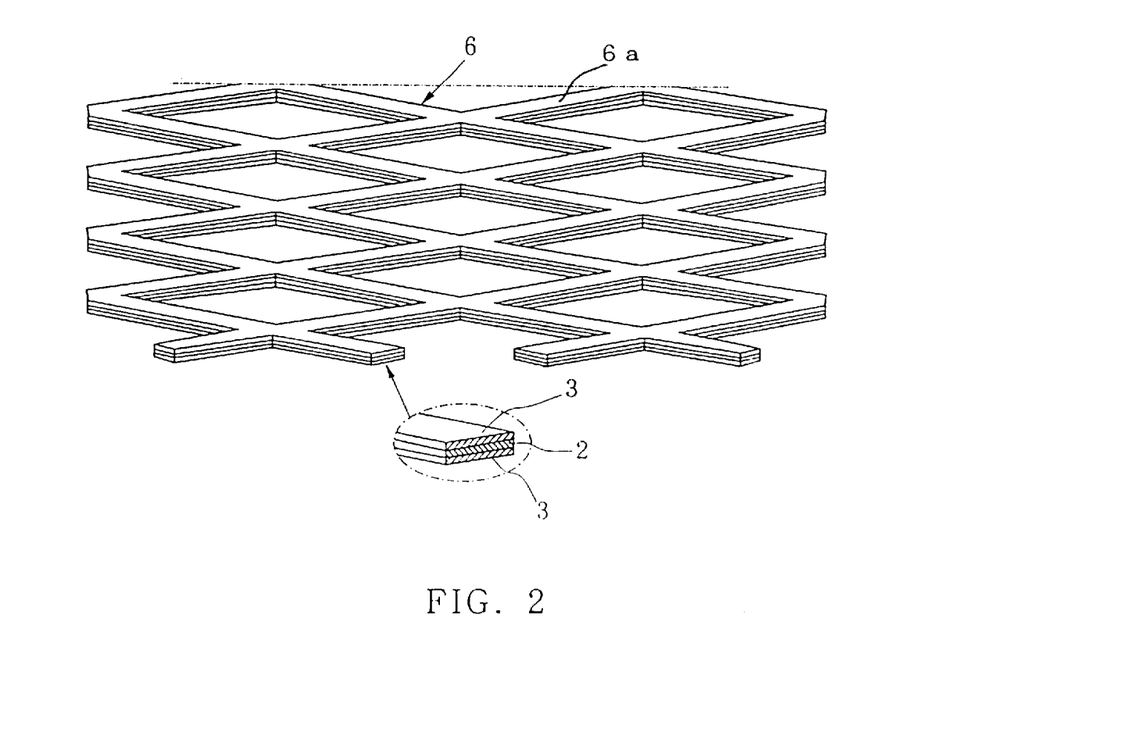
FIG. 2 is a perspective view showing a laterally uniaxially stretched meshy film (b) according to the present invention.

As shown in FIG. 2 and as in the case of (a) mentioned above, the longitudinally uniaxially stretched meshy film (b) used in the present invention is illustratively prepared by firstly producing a multilayered film comprising at least two layers from a first thermoplastic resin layer (I) and an adhesion layer (II) having a lower melting point than the thermoplastic resin layer (I) by use of an extrusion molding method such as a multilayer inflation method or multilayer T-die method, slightly stretching the thus produced multilayered film in the longitudinal direction at a stretch ratio of 1.1 to around 3 times by means of rolling, thereafter fibrillating the stretched multilayered film laterally and staggeringly in a cross-stitch form with a hot knife or a similar tool and then stretching the split film at a stretch ratio of 1.1 to 15 times, preferably 3 to 10 times, in the lateral direction thereby to obtain the laterally uniaxially stretched meshy film.

Figure 3:
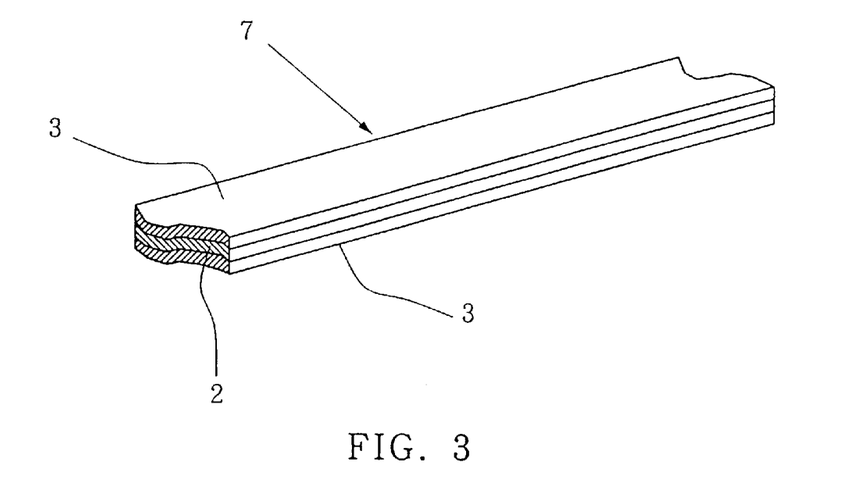
FIG. 3 is a perspective view showing a uniaxially stretched laminate (c) used in the present invention.

As shown in FIG. 3, the uniaxially stretched tape (c) may be prepared by firstly producing a multilayered film comprising at least two layers from a first thermoplastic resin layer (I) and an adhesion layer (I) having a lower melting point than the thermoplastic resin layer (I) by use of an extrusion molding method such as a multilayer inflation method or multilayer T-die method. The multilayered film is uniaxially stretched at a stretch ratio of 1.1 to 15 times, preferably 3 to 10 times, before and/or after cutting of the film, in the longitudinal and/or lateral direction thereby to obtain the uniaxially stretched tape.

Next there will be explained in detail a typical method of manufacturing a nonwoven fabric using (a) the longitudinally uniaxially stretched meshy film and/or (b) the laterally uniaxially stretched meshy film according to the present invention.

The method of manufacturing a nonwoven fabric according to the present invention comprises 1) a step of preparing, by means of extrusion molding, a multilayered film comprising a first thermoplastic resin layer (I) and an adhesion layer (II) containing the particular α-olefin (co)polymer and provided on one surface or both surfaces of the first thermoplastic resin layer (I), 2) a step of stretching the multilayered film, 3) a step of fibrillating or slitting the stretched multilayered film in parallel to the orientation axis to form a meshy film, 4) a step of spreading or laterally stretching the width of the stretched multilayered film fibrillated or slitted if desired and laminating such width-enlarged multilayered films with the adhesion layer (II) of one of the films being faced to the resin layer (I) of another one of the films in such a manner that the orientation axes of said any two adjacent films cross each other, and 5) a step of fusion bonding the multilayered films together under heat.

Hereunder, each step of said method of manufacturing a nonwoven fabric will be described in more detail.

The step 1) of preparing a multilayered film is a step in which a thermoplastic resin layer (I) is formed as a core layer and an adhesion layer (II) is simultaneously formed on one surface and/or both surfaces of the resin layer (I), preferably by means of inflation molding, thereby to form a multilayered film.

The stretching step 2) is a step in which the stretching is conducted at a stretch ratio of 5 to 15 times, preferably 6 to 10 times, by a roll stretching method in the case of longitudinal uniaxial stretching or by a pulley stretching method (both the methods being disclosed in Japanese Patent Gazette No. 30655/1982) in the case of lateral uniaxial stretching.

The fibrillating step 3) is a step in which the multilayered film stretched as described above is made to be in sliding contact with a fibrillator (rotary blade) rotating at a high speed to fibrillate (fibrillation to make a mesh) the film for forming a meshy film, and the slit step 3) is a step in which the stretched multilayered film is pressed by a hot blade rotating to generate slits in a cross-stitch form on the surface thereof for forming a meshy film.

The step 4) for alternately longitudinally and laterally laminating a plurality of stretched films is a step in which the width of the fibrillated or slitted meshy films is spread as required and a plurality of the meshy films are the resin layer (I) of one of the meshy films being faced to the adhesion layer (II) of another thereof and in such a manner that the orientation axes of said any two adjacent meshy films cross each other.

The fusion-bonding step 5) under heat is a step in which the meshy films laminated longitudinally and laterally as described above, so that the orientation axes cross each other, are supplied to a heating cylinder when they are fusion-bonded under heat while fixing the films so that contraction of their width will not occur. The fusion-bonding step is conducted under conditions to prevent the first thermoplastic resin, as the core layer, from losing its stretchability at a controlled temperature lower than the melting point of the first thermoplastic resin but higher than the melting point of the adhesion layer (II), thereby to obtain a nonwoven fabric.

On the other hand, in a more concrete method of manufacturing uniaxially stretched tapes, the adhesion layer (II) containing a particular α-olefin (co)polymer having a melting point lower than the first thermoplastic resin layer (I) is molded on one or both of the surfaces of the first thermoplastic resin layer (I) by means of extrusion molding such as by a multilayer inflation method or a multilayer T-die method, to form a multilayered film consisting of 2 or 3 layers.

Then the thus formed multilayered film is uniaxially stretched, but there is no restriction on a stretching method used, and the multilayered film is stretched preferably at a stretch ratio of 5 to 15 times, more preferably 6 to 10 times, by means of a roll stretching method as described above (free uniaxial stretching, proximity stretching), or by means of a hot plate stretching method, a tenter method, a pulley method or a rolling method. The stretching may be conducted in multiple stages.

If the stretch ratio of the uniaxially stretched meshy film or the uniaxially stretched tape is less than 1.1 times, then the mechanical strength of the resulting nonwoven fabric or woven fabric will not be sufficient. On the other hand, if the ratio is more than 15 times, it is difficult to stretch the film or tape according to the ordinary method, and this will disadvantageously require an expensive apparatus.

In a case of uniaxially stretched tapes, the film described above is cut into the form of tapes,each having a width of 3 to 50 mm or preferably 5 to 30 mm, which are then uniaxially stretched by means of rolling and/or stretching in the longitudinal direction. Otherwise the film may be first stretched and then cut into the form of a tape.

Figure 4:
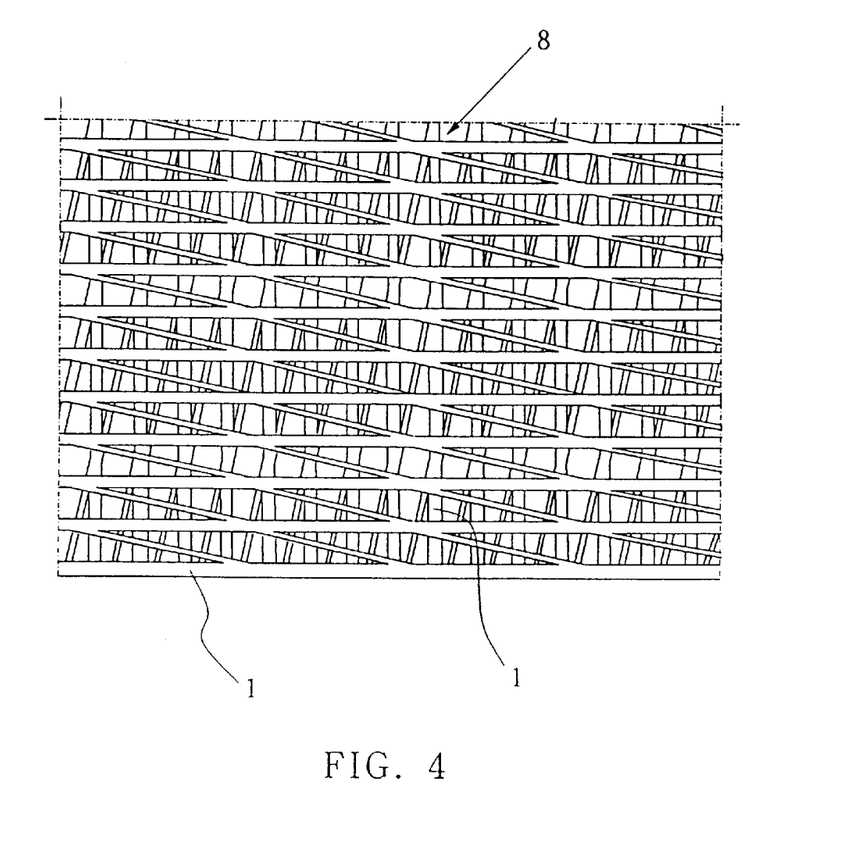
FIG. 4 shows a nonwoven fabric (A) in which a plurality of longitudinally uniaxially stretched films (a) are laminated together (a/a)
Figure 5:
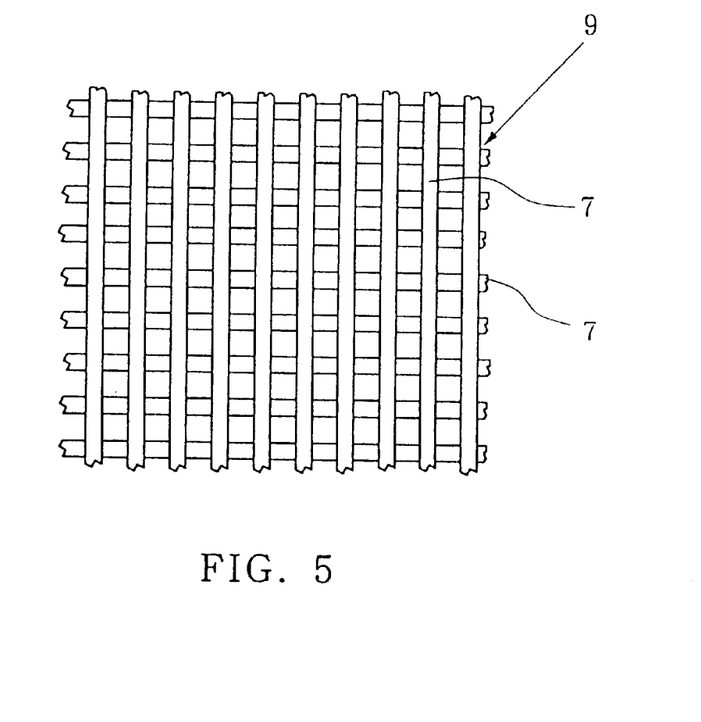
FIG. 5 shows a nonwoven fabric (C) in which a plurality of the uniaxially stretched tapes (c) are laminated together (c/c)
Figure 6:
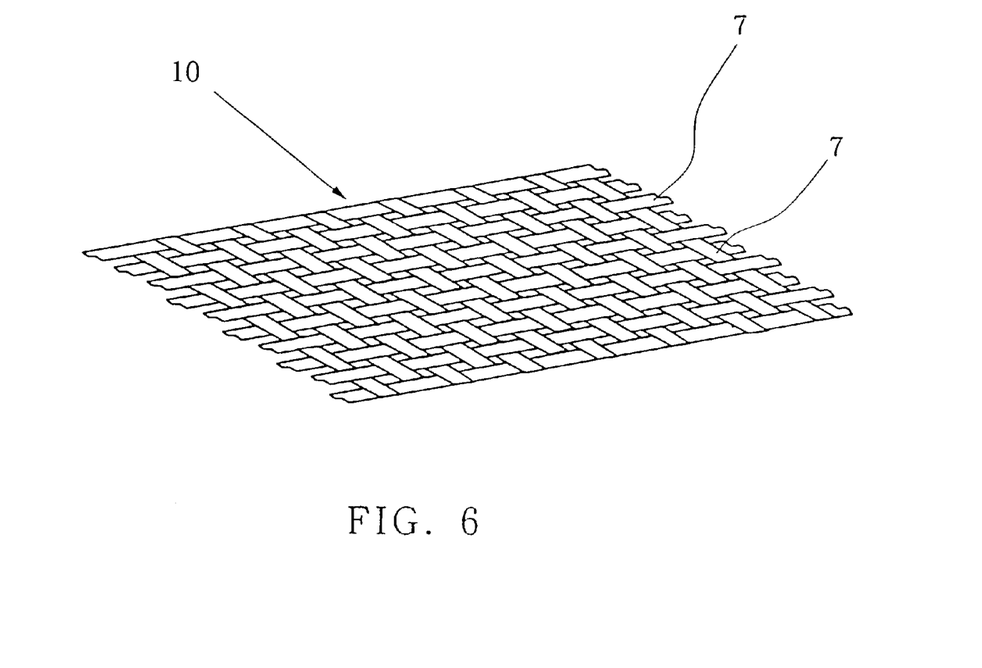
FIG. 6 shows a woven fabric (D) in which a plurality of uniaxially stretched tapes (c) are woven together.

The nonwoven fabrics or woven fabrics of the present invention include (1) a nonwoven fabric (A) obtained by laminating or weaving together longitudinally uniaxially stretched meshy films (a/a) as shown in FIG. 4; (2) a nonwoven fabric (B) in which (a) a longitudinally uniaxially stretched meshy film and (b) a laterally uniaxially stretched meshy film are laminated together (a/b); (3) a nonwoven fabric (C) in which uniaxially stretched tapes are laminated together (c/c) as shown in FIG. 5; (4) a woven fabric (D) in which uniaxially stretched tapes (C) are woven as shown in FIG. 6; (5) a nonwoven fabric of (A/C) or (A/D); (6) a nonwoven fabric of (B/C) or (B/D); (7) a nonwoven fabric of (C/D), (8) a nonwoven fabric of (a/C) or (D/a), a nonwoven fabric of (b/C/b) or (b/D/b); (9) a nonwoven fabric of (C/a/C) or (C/b/C), (D/a/D) or (D/b/D); (10) a nonwoven fabric of (A/C/A), (A/D/A) or (B/C/B), (B/D/B); and (11) a nonwoven fabric of (A/C/B), (A/D/B). Further, in a case of a woven fabric, for example, uniaxially stretched tapes having a two-layer structure, may be laminated together via a part of the adhesion layer (II).

The reinforced laminated body of the present invention comprises the laminated body, nonwoven fabric or woven fabric, and a base material, and there is no restriction on the order in which said body, fabrics and base material are laminated.

The base material described above includes a synthetic resin film sheet such as a film sheet, a foamed film sheet or a perforated sheet; a paper product such as Japanese traditional paper, kraft paper or paper board; a rubber film sheet; a metal foil such as an aluminium foil; various types of nonwoven fabric, for example, dry nonwoven fabric such as melt blown nonwoven fabric, span lace nonwoven fabric and wet nonwoven fabric such as pulp nonwoven fabric; a woven fabric such as a cloth; a metal; ceramic; or glass.

The base material may be attached to or inserted between the uniaxially stretched laminates, and the number thereof used is not particularly limited.

The reinforced laminated bodies of the present invention include those composed respectively of OF/F, F/OF'/F, OF/Al, A/K (kraft paper), A/MPF, A/HS and A/MF, wherein:

OF represents two-layered uniaxially stretched film comprising a high-density polyethylene (HDPE)/low-density ethylene-α-olefin copolymer (MLL) prepared by using a metallocene catalyst;

OF' represents three-layered uniaxially stretched film comprising a low-density ethylene-α-olefin copolymer (MLL) prepared by using a metallocene catalyst/high-density polyethylene (HDPE)/low-density ethylene-α-olefin copolymer (MLL) prepared by using a metallocene catalyst (MLL);

F represents low-density polyethylene (LDPE) film prepared according to a high-pressure radical polymerization method;

Al represents aluminium foil;

A represents three-layered uniaxially stretched nonwoven fabric comprising a low-density ethylene-α-olefin copolymer (MLL) prepared by using a metallocene catalyst/high-density polyethylene (HDPE)/a low-density ethylene-α-olefin copolymer (MLL) prepared by using a metallocene catalyst;

K represents kraft paper;

MPF represents porous film;

HS represents foamed sheet; and

MF represents melt blown nonwoven fabric.

The reinforced laminated bodies according to the present invention are used as a sheet for a picnic spread, a hood or cover for a vehicle, a covering material for agricultural use, cement bags, synthetic resin pellet bags, a base material for adhesive tape, and a masking film or the like. The nonwoven fabrics or woven fabrics of the present invention are used as covering materials for agricultural use, materials for construction, and products for home use including covering materials for use in agriculture, covers for greens in golf courses, filters, water bags, various types of bags, oil absorbers, flower wraps, house wraps, mats, wipers and waste cloths.

In the present invention, various types of additives may be added within the spirit of the present invention and include fillers such as carbon black, calcium carbonate or silica; antioxidants; flame retardants; cross-linking agents; foaming agents; coloring agents; pigments; ultraviolet absorbers and smoothing agents.

BRIEF DESCRIPTION OF THE DRAWINGS

In these drawings, reference numeral 1 represents a longitudinally uniaxially stretched meshy film; 2, a first thermoplastic resin layer; 3, an adhesive layer; 4, a ribbon (a trund tape); 5, a ribbon of branch fibers; 6, a laterally uniaxially stretched meshy film; 6a, a ribbon: 7, a uniaxially stretched multilayered tape; 8 and 9, meshy nonwoven fabrics; and 10, a woven fabric.

DESCRIPTION OF THE PREFERRED EMBODIMENTS

The present invention will be better understood by the following Examples and Comparative Examples.

Examples 1–7 and Comparative Examples 1–8
Polymerization of ethylene-α-olefin comonomers
A1) Polymerization of ethylene-butene-1 comonomers A 3-Liter stainless autoclave with an agitator was purged with nitrogen, charged with 1.5 L of refined toluene, incorporated with 25 g of butene-1, further incorporated with a mixed solution of bis (n-butyl cyclopentadienyl) zirconium dichloride (0.02 mmole in terms of Zr) and methyl alumoxan [MAO] (MAO/Zr=500 [molar ratio]), and then raised in temperature to 80° C. The thus charged autoclave was then further charged with ethylene in such an amount as to maintain the ethylene pressure at 9 kg/cm$^2$G therein to carry out continuous copolymerization of ethylene with butene-1 at said temperature for one hour. It should be noted that a quantity of such a copolymer required in the following Examples was obtained by repeating said copolymerization. The physical properties of the thus obtained ethylene butene-1 copolymer are described below:

MFR: 5.0 g/10 minutes,
Density: 0.905 g/cm$^3$,
Melting point: 97° C.,
Molecular weight distribution (Mw/Mn): 2.3

A2) Polymerization of ethylene-octene-1 comonomers.

A 3-Liter stainless autoclave with an agitator was purged with nitrogen, charged with 1.5 L of refined toluene, incorporated with 150 ml of octene-1 and then raised in temperature to 140° C. The thus charged autoclave was further charged with ethylene at 30 kg/cm$^2$G and then incorporated with a mixed solution of (tert-butyl amide) dimethyl (tetramethyl cyclopentadienyl) silane zirconium dichloride (in terms of Zr: 0.02 mmole) and methyl alumoxan [MAO] (MAO/Zr=500 [molar ratio]) dissolved in toluene. The copolymerization in the autoclave was stopped in 15 minutes to obtain a copolymer. A quantity of such a copolymer needed in the following Examples was obtained by repeating said polymerization procedure. The physical properties of the thus obtained ethylene-octene-1 copolymer are described below.

MFR: 2.1 g/10 minutes,
Density: 0.911 g/cm$^3$,
Melting point: 102° C.,
Molecular weight distribution (Mw/Mn): 3.0

B1-1: linear low-density polyethylene prepared by using Ziegler catalyst (Density=0.925 g/cm$^3$; MFR=2.0 g/10 minutes; Trade name: Nisseki Rinilex, BF 3310, produced by Nippon Petrochemicals Co., Ltd.), B1-2: very low-density polyethylene (Density=0.905 g/cm$^3$, MFR=1.0 g/10 minutes; Trade name: Nisseki Softrex, D9510; produced by Nippon Petrochemicals Co., Ltd.), B2-1: low-density polyethylene prepared by means of high-pressure radical polymerization (Density=0.924 g/cm$^3$, MFR=3.0 g/10 minutes; Trade name: Nisseki Lexlon, F30; produced by Nippon Petrochemicals Co., Ltd.), B2-2: ethylene-vinyl acetate copolymer (Content of VA=15% by weight; MFR=1.5 g/10 minutes; Trade name: Nisseki Rexlon, V270; produced by Nippon Petrochemicals Co., Ltd.), B2-3: ethylene-ethyl acrylate copolymer (Content of EA=10% by weight; MFR=1.5 g/10 minutes; Trade name: Nisseki Rexlon EEA, A2100; produced by Nippon Petrochemicals Co., Ltd.).

Manufacture of Nonwoven Fabric

In the step of manufacturing a film, according to a multilayer water-cooling inflation method, a high-density polyethylene (Density=0.956 g/cm$^3$; MFR=1.0 g/10 minutes; Trade name: Nisseki Staflene E710; produced by Nippon Petrochemicals Co., Ltd.) was provided as a core layer, after which an ethylene-α-olefin copolymer prepared using the metallocene catalyst as described below or a composition thereof was provided on both surfaces of the core layer to manufacture a multilayered film which is composed of three layers. The multilayered film was composed of an adhesion layer having a thickness of 15 μm, a core layer having a thickness of 100 μm, and an adhesion layer having a thickness of 15 μm, and has a width of 1 m. Then in the stretching step, the multilayered film was stretched at a stretch ratio of 8 times while running. Then in the fibrillating step, a fibrillator rotor disclosed in Japanese Utility Model Gazette No. 38979/76 was rotated and contacted with the multilayered film to form therein a number of slits in the longitudinal direction, thereby to obtain a longitudinally uniaxially stretched meshy film having slits in a cross-stitch form (Thickness ratio: LL adhesion layer=5 μm/HD layer=35 μm/LL adhesion layer=5 μm).

Then in the spreading step, this longitudinally uniaxially stretched meshy film was furthermore spread in the lateral direction at a spreading ratio of 2.5 times to obtain a spread meshy film (a). Further, in the laminating step, a plurality of the spread meshy films (a) were laminated so that the orientation axes of the films cross each other, and fusion-bonded together under heat at an adhesion temperature of 120° C. to obtain a meshy nonwoven fabric (A). The adhesion strength and low-temperature heat sealability of the thus obtained crosswise laminated films are as shown in Table 1.

The tests were carried out under the following conditions.
1) Melt flow rate: tested in accordance with ASTM D 1238-57T (190° C., 2.16 Kg load),
2) Density: tested in accordance with ASTM D 1505-68,
3) Molecular weight distribution (Mw/Mn): measured using Gel Permeation Chromatography made by water and ortho-dichlorobenzene as a solvent at a temperature of 135° C.,
4) Bond strength of the crosswise laminated films (Kg) was tested using Tensilon, a U-shaped tool connected at the upper portion to the central portion of a test piece (Length 200 mm×Width 150 mm). A load cell of the Tensilon device was hooked at the central portion of the test piece, and the bottom of the test piece was fixed to the Tensilon. The test piece was pulled with a pulling speed of 500 mm/min and a chart speed of 50 mm/mm. An average value of amplitudes of load value, indicated when meshes of the test piece were loosened, was obtained as the bond strength,
5) Low-temperature heat sealability was tested using a heat seal tester. Heat sealing tests were conducted on the crosswise laminated films under the conditions of a seal width of 5 mm, a seal time of 1 second and a seal pressure of 2 Kg/cm$^2$, by changing a seal temperature, after which peel strength of a test piece with a width of 25 mm was measured by 180 degree (angle) peeling test (Tensilon pulling speed: 300 mm/min). The low-temperature heat sealability was indicated by the lowest temperature at which the peel strength became 150 g/25 mm or more.

the adhesiveness is low. Also in Comparative Examples 2 to 4 and 6, temperatures for the low-heat sealability are high, and in each of Comparative Examples 5, 7 and 8, the adhesiveness is low.

EFFECTS OF THE INVENTION

In a uniaxially stretched laminate used in the present invention, an adhesion layer (II) of said laminate which is a multilayered film formed of a first thermoplastic resin layer (I) having a high melting point as a base is made of a particular ethylene-α-olefin copolymer, thereby to enable the production of a nonwoven or woven fabric having excellent adhesion strength, low-temperature heat sealability and hot tack as well as satisfactory mechanical strength including anti-tearing strength. Further, in cases of nonwoven and woven fabrics, the crosswise laminated films or tapes constituting the fabrics are high in adhesion strength, will cause no trouble in each of the steps of manufacturing, splitting, laminating and fusion-bonding the films under heat, and are also excellent in physical properties such as heat sealability, thereby to enable the high-speed production of bags and reinforced laminated bodies.

What is claimed is:

1. A laminated body comprising a uniaxially stretched composite film, said composite film comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer having a

TABLE 1

| Example and Comparative Example | Ex. 1 | Ex. 2 | Ex. 3 | Ex. 4 | Comp. Ex. 1 | Ex. 5 | Ex. 6 | Ex. 7 |
|---|---|---|---|---|---|---|---|---|
| adhesive layer | | | | | | | | |
| MLL (A1) | 100 | | 70 | 50 | 20 | 70 | 70 | 70 |
| MLL (A2) | | 100 | | | | | | |
| LDPE (B2-1) | | | 30 | 50 | 80 | | | |
| VLDPE (B1-2) | | | | | | 30 | | |
| EVA (B2-2) | | | | | | | 30 | |
| EEA (B2-3) | | | | | | | | 30 |
| adhesiveness (g) | 8800 | 7900 | 7200 | 5900 | 2800 | 7600 | 6100 | 6900 |
| heat sealability (° C.) | 98 | 102 | 101 | 103 | 107 | 105 | 96 | 100 |

| Comparative Example | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|
| adhesive layer | | | | | | | |
| LL (B-1) | 70 | 70 | 100 | | | | |
| LDPE (B2-1) | | | | 100 | | | |
| VLDPE (B1-2) | | 30 | | | 100 | | |
| EVA (B2-2) | 30 | | | | | 100 | |
| EEA (B2-3) | | | | | | | 100 |
| adhesiveness (g) | 3000 | 3400 | 3700 | 2500 | 2800 | 2100 | 2700 |
| heat-sealability (° C.) | 115 | 120 | 108 | 118 | 90 | 102 | |

As shown in the above Table 1, in Examples 1 to 7 in which a particular ethylene-α-olefin copolymer was used, both the low-temperature heat sealability and adhesiveness are excellent.

On the other hand, in Comparative Example 1, a temperature for the low-temperature heat sealability is high, and melt flow rate of 0.01 g to 100 g/10 minutes, wherein said α-olefin polymer or copolymer is formed in the presence of at least one Group IV transition metal catalyst complex which comprises a cyclopentadienyl group, and (B) up to 70% by weight of an olefinic polymer, and optionally comprising an additive selected from fillers, pigments, antioxidants, flame retardant agents, crosslinking agents, foaming agents, coloring agents, ultraviolet absorbers, smoothing agents or combinations thereof.

2. A laminated body according to claim 1, wherein said α-olefin polymer or copolymer is an ethylene-α-olefin copolymer having a density of 0.86 to 0.94 g/cm$^3$.

3. A laminated body according to claim 1, wherein said olefinic polymer (B) is at least one member selected from the following ethylene-based polymers ($B_1$) and ($B_2$):

(B$_1$) an ethylene-α-olefin copolymer having a density of 0.86 to 0.95 g/cm$^3$, and (B2) a low-density polyethylene obtained by means of radical polymerization at a high pressure, an ethylene/vinyl ester copolymer, and a copolymer of ethylene and an α,β-unsaturated carboxylic acid or its alkyl ester derivative.

4. A laminated body according to claim 1, wherein said composite film has been uniaxially stretched from an original unstretched state by an amount to achieve a stretch ratio in a range from 1.1:1 to 15:1.

5. A laminated body according to claim 1, wherein said thermoplastic resin layer in said composite film has a thickness of from 20 to 100 μm and said adhesion layer has a thickness of from 3 to 60 μm.

6. A laminated body according to claim 1, wherein said laminated body comprises at least one uniaxially stretched composite film selected from the group consisting of: (a) composite films uniaxially stretched in a machine direction, (b) composite films uniaxially stretched in a direction traverse to a machine direction and (c) uniaxially stretched composite tapes.

7. A laminated body according to claim 1, wherein said laminated body further comprises at least one other composite film, said at least one other composite film being uniaxially stretched and comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, and wherein the thermoplastic resin layer of one of the composite films is laminated to the adhesion layer of another composite film.

8. A laminated body according to claim 1, wherein said laminated body further comprises at least one other composite film, said at least one other composite film being uniaxially stretched and comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, and wherein the adhesion layer of one of the composite films is laminated to the adhesion layer of another composite film.

9. A laminated body according to claim 7, wherein said α-olefin polymer or copolymer is an ethylene-α-olefin copolymer having a density of 0.86 to 0.94 g/cm$^3$.

10. A laminated body according to claim 8, wherein said α-olefin polymer or copolymer is an ethylene-α-olefin copolymer having a density of 0.86 to 0.94 g/cm$^3$.

11. A laminated body according to claim 7, wherein said olefinic polymer (B) is at least one member selected from the following ethylene polymers ($B_1$) and ($B_2$): wherein ($B_1$) is an ethylene-α-olefin copolymer having a density of 0.86 to 0.95 g/cm$^3$; and ($B_2$) is a low-density polyethylene obtained by means of radical polymerization at a high pressure, an ethylene/vinyl ester copolymer, or a copolymer of ethylene and an α,β-unsaturated carboxylic acid or its alkyl ester derivative.

12. A laminated body according to claim 8 wherein said olefinic polymer (B) is at least one member selected from the following ethylene-based polymers ($B_1$) and ($B_2$): wherein ($B_1$) is an ethylene-α-olefin copolymer having a density of 0.86 to 0.95 g/cm$^3$; and ($B_2$) is a low-density polyethylene obtained by means of radical polymerization at a high pressure, an ethylene/vinyl ester copolymer, or a copolymer of ethylene and an α,β-unsaturated carboxylic acid or its alkyl ester derivative.

13. A laminated body according to claim 2 wherein said olefinic polymer (B) is at least one member selected from the following ethylene-based polymers ($B_1$) and ($B_2$): wherein ($B_1$) is an ethylene-α-olefin copolymer having a density of 0.86 to 0.95 g/cm$^3$; and ($B_2$) is a low-density polyethylene obtained by means of radical polymerization at a high pressure, an ethylene/vinyl ester copolymer, or a copolymer of ethylene and an α,β-unsaturated carboxylic acid or its alkyl ester derivative.

14. A laminated body according to claim 7 wherein each composite film has been uniaxially stretched from an original unstretched state by an amount to achieve a stretch ratio in a range of from 1.1:1 to 15:1.

15. A laminated body according to claim 8 wherein each composite film has been uniaxially stretched from an original unstretched state by an amount to achieve a stretch ratio in a range of from 1.1:1 to 15:1.

16. A laminated body according to claim 2 wherein said composite film has been uniaxially stretched from an original unstretched state by an amount to achieve a stretch ratio in a range of from 1.1:1 to 15:1.

17. A laminated body according to claim 3 wherein said composite film has been uniaxially stretched from an original unstretched state by an amount to achieve a stretch ratio in a range of from 1.1:1 to 15:1.

18. A laminated body according to claim 7 wherein said first thermoplastic resin layer in each of the composite films has a thickness of from 20 to 100 μm and said adhesion layer in each of the composite films has a thickness of from 3 to 60 μm.

19. A laminated body according to claim 8 wherein said first thermoplastic resin layer of each of the composite films has a thickness of from 20 to 100 μm and said adhesion layer of each of the composite films has a thickness of from 3 to 60 μm.

20. A laminated body according to claim 2 wherein said thermoplastic resin has a thickness of from 20 to 100 μm and said adhesion layer has a thickness of from 3 to 60 μm.

21. A laminated body according to claim 3 wherein said thermoplastic resin layer has a thickness of from 20 to 100 μm and said adhesion layer has a thickness of from 3 to 60 μm.

22. A laminated body according to claim 4 wherein said thermoplastic resin layer has a thickness of from 20 to 100 μm and said adhesion layer has a thickness of from 3 to 60 μm.

23. A laminated body according to claim 7 wherein the composite films are selected from the group consisting of: (a) composite films uniaxially stretched in a machine direction; (b) composite films uniaxially stretched in a direction transverse to a machine direction; and (c) uniaxially stretched composite tapes.

24. A laminated body according to claim 8 wherein the composite films are selected from the group consisting of: (a) composite films uniaxially stretched in a machine direction; (b) composite films uniaxially stretched in a direction transverse to a machine direction; and (c) uniaxially stretched composite tapes.

25. A laminated body according to claim 2 wherein the composite films are selected from the group consisting of: (a) composite films uniaxially stretched in a machine direction; (b) composite films uniaxially stretched in a direction transverse to a machine direction; and (c) uniaxially stretched composite tapes.

26. A laminated body according to claim 3 wherein the composite films are selected from the group consisting of: (a) composite films uniaxially stretched in a machine direction; (b) composite films uniaxially stretched in a direction transverse to a machine direction; and (c) uniaxially stretched composite tapes.

27. A laminated body according to claim 4 wherein the composite films are selected from the group consisting of: (a) composite films uniaxially stretched in a machine direction; (b) composite films uniaxially stretched in a direction transverse to a machine direction; and (c) uniaxially stretched composite tapes.

28. A laminated body according to claim 5 wherein the composite films are selected from the group consisting of: (a) composite films uniaxially stretched in a machine direction; (b) composite films uniaxially stretched in a direction transverse to a machine direction; and (c) uniaxially stretched composite tapes.

29. A laminated body as claimed in claim 1 wherein said α-olefin polymer or copolymer A is selected from the group consisting of ethylene homopolymers, propylene homopolymers, copolymers of ethylene and one or more α-olefins, and copolymers of propylene with one or more other α-olefins.

30. A laminated body according to claim 1, wherein said adhesion layer consists essentially of, as its polymeric component: (A) 100 to 50% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 50% by weight of an olefinic polymer.

31. A laminated body according to claim 1, wherein said adhesion layer consists essentially of, as its polymeric component: (A) 100 to 70% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 30% by weight of an olefinic polymer.

32. A nonwoven fabric comprising at least two uniaxially stretched composite films, said films being selected from the group consisting of: (a) composite mesh films uniaxially stretched in a machine direction, (b) composite mesh films uniaxially stretched in a direction transverse to said machine direction and (c) uniaxially stretched composite tapes, wherein each of said at least two uniaxially stretched composite films comprises a thermoplastic resin layer and an adhesion layer having a lower melting point than said thermoplastic resin layer and being provided on one surface of said thermoplastic resin layer, said adhesion layer consisting essentially of, as its polymeric component: (A) 100 to 30% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, and wherein said at least two uniaxially stretched composite films are laminated to each other in such a manner that the orientation axes of any two adjacent composite films are non-parallel with respect to each other, and the thermoplastic resin layer of at least one of said composite films is laminated to the adhesion layer of another of said composite films.

33. A nonwoven fabric according to claim 32, wherein said adhesion layer consists essentially of, as its polymeric component: (A) 100 to 50% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 50% by weight of an olefinic polymer.

34. A nonwoven fabric according to claim 32, wherein said adhesion layer consists essentially of, as its polymeric component: (A) 100 to 70% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 30% by weight of an olefinic polymer.

35. A reinforced laminated body which comprises a base material for a laminated body, and a laminated body, said base material being selected from the group consisting of a synthetic resin film sheet, paper product, rubber film sheet, metal foil, nonwoven fabric, woven fabric, metal, ceramic and glass, said laminated body comprising a uniaxially stretched composite film, said composite film comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer having a melt flow rate of 0.01 g to 100 g/10 minutes wherein said α-olefin polymer or copolymer is formed in the presence of at least one Group IV transition metal catalyst complex which comprises a cyclopentadienyl group; and (B) up to 70% by weight of an olefinic polymer, said base material being attached to said laminated body or inserted between layers of said laminated body to reinforce the laminated body.

36. A reinforced laminated body according to claim 35, comprising a plurality of uniaxially stretched composite films, each of said plurality of uniaxially stretched composite films comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, wherein said plurality of composite films are laminated together such that the orientation axes of any two of said plurality of composite films which are laminated to each other are non-parallel with respect to each other.

37. A reinforced laminated body according to claim 35, wherein said laminated body comprises at least two uniaxially stretched composite films defining a nonwoven fabric, said at least two composite films being selected from the group consisting of (a) composite mesh films uniaxially stretched in a machine direction, (b) composite mesh films uniaxially stretched in a direction transverse to said machine direction; and (c) uniaxially stretched composite films, wherein said at least two uniaxially stretched composite films are laminated together such that the orientation axes of two of said composite films which are laminated to each other are parallel with respect to each other.

38. A reinforced laminated body according to claim 35, wherein said laminated body comprises at least two uniaxially stretched composite films defining a nonwoven fabric, said at least two composite films being selected from the group consisting of (a) composite mesh films uniaxially stretched in a machine direction, (b) composite mesh films uniaxially stretched in a direction transverse to said machine direction; and (c) uniaxially stretched composite films, wherein said at least two uniaxially stretched composite films are laminated together such that the orientation axes of two of said composite films which are laminated to each other are non-parallel with respect to each other.

39. A reinforced laminated body according to claim 35, comprising at least two uniaxially stretched composite tapes which define a woven fabric, said at least two uniaxially stretched composite tapes being woven together such that the orientation axes of each of at least two laminated composite tapes are parallel with respect to each other.

40. A reinforced laminated body according to claim 35, comprising at least two uniaxially stretched composite tapes which define a woven fabric, said at least two uniaxially stretched composite tapes being woven together such that the orientation axes of each of at least two laminated composite tapes are non-parallel with respect to each other.

41. A reinforced laminated body according to claim 35, wherein said adhesion layer consists essentially of, as its polymeric component: (A) 100 to 50% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 50% by weight of an olefinic polymer.

42. A reinforced laminated body according to claim 35, wherein said adhesion layer consists essentially of, as its polymeric component: (A) 100 to 70% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 30% by weight of an olefinic polymer.

43. A woven fabric comprising woven uniaxially stretched composite tapes, each of said composite tapes comprising a thermoplastic resin layer and an adhesion layer, said adhesion layer having a lower melting point than said thermoplastic resin layer and being provided on one surface of said resin layer, said adhesion layer consisting essentially of, as its polymeric component: (A) from 30% by weight to 100% by weight of an α-olefin polymer or copolymer, said polymer or copolymer having a melt flow rate of from 0.01 g/10 minutes to 100 g/10 minutes, providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, said uniaxially stretched composite tapes being woven together such that the orientation axes of any overlapping composite tapes are non-parallel with respect to each other and the thermoplastic resin layer of any one of said composite tapes contacts the adhesion layer of an adjacent composite tape.

44. A woven fabric according to claim 43, wherein the orientation axes of two laminated composite tapes are substantially transverse to each other.

45. A woven fabric according to claim 43, wherein said α-olefin polymer or copolymer A is a member selected from the group consisting of ethylene homopolymers, propylene homopolymers, copolymers of ethylene and one or more α-olefins, and copolymers of propylene and one or more other α-olefins.

46. A woven fabric according to claim 43, wherein said adhesion layer consists essentially of, as its polymeric component: (A) 100 to 50% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 50% by weight of an olefinic polymer.

47. A woven fabric according to claim 43, wherein said adhesion layer consists essentially of, as its polymeric component: (A) 100 to 70% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 30% by weight of an olefin polymer.

48. A method for manufacturing a laminated body comprising:

providing a multilayered film comprising a thermoplastic resin layer and an adhesion layer, said adhesion layer having a lower melting point than said thermoplastic resin layer and being provided on at least one surface of said thermoplastic resin layer, said adhesion layer consisting essentially of, as its polymeric component: (A) 100 to 30% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 70% by weight of an olefinic polymer, and stretching the multilayered film in a machine direction or in a direction transverse to said machine direction.

49. A method according to claim 48, wherein said adhesion layer consists essentially of, as its polymeric component: (A) 100 to 50% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 50% by weight of an olefinic polymer.

50. A method according to claim 48, wherein said adhesion layer consists essentially of, as its polymeric component: (A) 100 to 70% by weight of an α-olefin polymer or copolymer, said polymer or copolymer having a melt flow rate of 0.01 g to 100 g/10 minutes and providing adhesive properties upon lamination, wherein said α-olefin polymer or copolymer is formed in the presence of at least one Group IV transition metal catalyst complex which comprises a cyclopentadienyl group; and (B) up to 30% by weight of an olefinic polymer.

51. A method as claimed in claim 48, wherein said multilayered film is provided by extrusion molding and uniaxially stretched to achieve a stretch ratio of from 1.1:1 to 15:1.

52. A method as claimed in claim 48 further comprising forming said multilayered film into a meshy film before or after stretching.

53. A method as claimed in claim 48 further comprising forming said multilayered film into a tape before or after stretching.

54. A method for making a laminated body comprising fusion bonding of a first multilayered meshy film obtained as in claim 52 to a second multilayered meshy film obtained as in claim 52, with the adhesion layer of one of the films facing the thermoplastic resin layer of the other film and with the stretch orientation axis of the first multilayered film being non-parallel to the stretch orientation axis of the second multilayered film to obtain a nonwoven fabric.

55. A method for making a laminated body comprising fusion bonding of a first tape obtained as in claim 53 to a second tape obtained as in claim 53, with the adhesion layer of one of the tapes facing the thermoplastic resin layer of the other tape and with the stretch orientation axis of the first tape being non-parallel to the stretch orientation axis of the second tape to obtain a nonwoven fabric.

* * * * *